(12) United States Patent
Nishioka

(10) Patent No.: US 8,090,257 B2
(45) Date of Patent: Jan. 3, 2012

(54) OPTICAL COMMUNICATION SYSTEM, OPTICAL COMMUNICATION APPARATUS, AND METHOD OF MONITORING FAULT ALARM IN PATH SECTION DETOUR

(75) Inventor: Itaru Nishioka, Tokyo (JP)

(73) Assignee: NEC Corporation, Tokyo (JP)

( * ) Notice: Subject to any disclaimer, the term of this patent is extended or adjusted under 35 U.S.C. 154(b) by 899 days.

(21) Appl. No.: 12/050,558

(22) Filed: Mar. 18, 2008

(65) Prior Publication Data

US 2008/0240710 A1 Oct. 2, 2008

(30) Foreign Application Priority Data

Mar. 27, 2007 (JP) ................................. 2007-082200

(51) Int. Cl.
*H04B 10/00* (2006.01)
*H04B 17/00* (2006.01)
*H04J 14/00* (2006.01)
(52) U.S. Cl. .................. 398/5; 398/20; 398/17; 398/57
(58) Field of Classification Search .................. 398/5, 7, 398/20, 33, 34, 43, 50, 56, 57, 68, 107, 177
See application file for complete search history.

(56) References Cited

U.S. PATENT DOCUMENTS

| | | | |
|---|---|---|---|
| 5,491,572 A * | 2/1996 | Ohara | 398/15 |
| 5,640,140 A * | 6/1997 | Oka et al. | 340/506 |
| 6,005,694 A * | 12/1999 | Liu | 398/6 |
| 6,532,089 B1 * | 3/2003 | Asahi | 398/82 |
| 6,778,725 B1 * | 8/2004 | Kakizaki et al. | 385/16 |
| 6,839,480 B2 * | 1/2005 | Kakizaki et al. | 385/16 |
| 7,206,475 B2 * | 4/2007 | Kakizaki et al. | 385/16 |
| 2003/0128979 A1 * | 7/2003 | Kitajima et al. | 398/12 |
| 2003/0189920 A1 * | 10/2003 | Erami et al. | 370/351 |
| 2004/0208547 A1 * | 10/2004 | Sabat et al. | 398/50 |
| 2005/0281556 A1 * | 12/2005 | Kitajima et al. | 398/45 |
| 2007/0115834 A1 * | 5/2007 | Cuni et al. | 370/241 |

FOREIGN PATENT DOCUMENTS

JP 2003-258851 A 9/2003

* cited by examiner

*Primary Examiner* — Kenneth N Vanderpuye
*Assistant Examiner* — Abbas H Alagheband
(74) *Attorney, Agent, or Firm* — Sughrue Mion, PLLC

(57) ABSTRACT

The optical communication system of the present invention is constructed with a data plane and a control plane, and includes a first monitor for monitoring a path alarm on the data plane, a second monitor for monitoring a path alarm on the control plane, and an alarm comparator for comparing alarm statuses of the optical paths that the first monitor and the second monitor preserve, wherein an optical communication apparatus, of which the first monitor and the second monitor both are in a status of having detected the alarm, operate so as to start an operation of avoiding a fault. Such a configuration makes it possible to make a detour only around an appropriate section including a fault location without performing an erroneous operation when a fault has occurred in an optical path, in which a plurality of detour sections, in an all-optical communication system.

11 Claims, 8 Drawing Sheets

| MAIN SIGNAL ALARM STATUS | PSEUDO ALARM STATUS | NECESSITY OF DETOUR |
|---|---|---|
| NON-EXISTENCE | NON-EXISTENCE | UNNECESSARY |
| NON-EXISTENCE | EXISTENCE | UNNECESSARY |
| EXISTENCE | NON-EXISTENCE | UNNECESSARY |
| EXISTENCE | EXISTENCE | NECESSARY |

FIG. 8
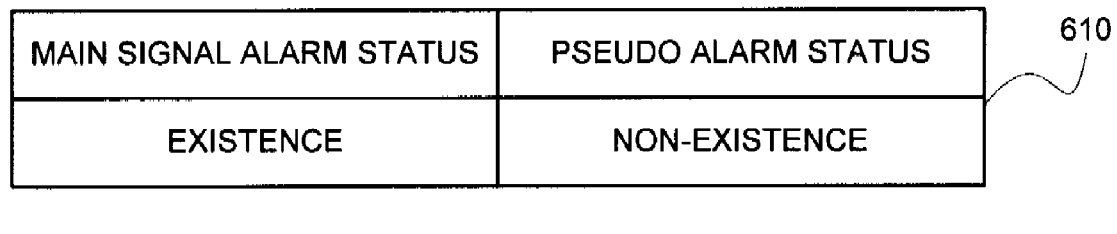
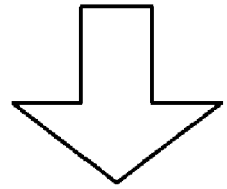
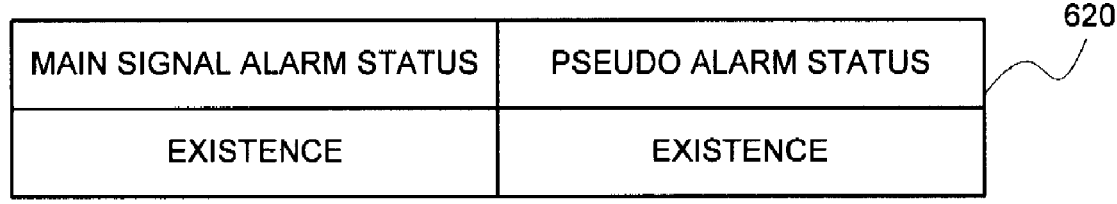

OPTICAL COMMUNICATION SYSTEM, OPTICAL COMMUNICATION APPARATUS, AND METHOD OF MONITORING FAULT ALARM IN PATH SECTION DETOUR

INCORPORATION BY REFERENCE

This application is based upon and claims the benefit of priority from Japanese patent application No. 2007-082200, filed on Mar. 27, 2007, the disclosure of which is incorporated herein in its entirety by reference.

RELATED ART

The present invention relates to an optical communication system, an optical communication apparatus, and a method of making a detour around a faulty section of an optical path, and more particularly to an all-optical communication system for switching a path with an optical signal kept as it stands in a multi-ring type topology or a mesh type topology, which enables a detour for each section by dividing an optical path into a plurality of sections, and making a detour only around the corresponding section when a fault is detected, an optical communication apparatus thereof, and a method of monitoring a default alarm in a method of making a detour around a path section, being a faulty section.

In the conventional optical communication system in which an optical signal is converted into an electrical one, generally, it is either for each path or for each WDM transfer link that a detour is made around a faulty location. With a switchover being made for each path, a switchover to a stand-by route of the path is made at the moment of having detected a fault by converting an optical signal into an electrical one in a terminating node of the path, and monitoring the electrical signal. With a switchover being made for each WDM transfer link, optical signals of all paths are converted into electrical ones for a time being to monitor a fault, and when a fault is detected in all or one part of the paths, a switchover to a stand-by WDM transfer link is made. In such a manner, in both of the switchover being made for each path and the switchover being made for each WDM transfer link, a fault is detected at the termination point in which an optical signal has been converted into an electrical one, thereby enabling a switchover to be made between the terminating points.

However, in the all-optical communication system, it is difficult to apply a fault avoidance being made for each link because the optical signal of the optical path is not converted to an electrical signal WDM transfer link by WDM transfer link in the transit optical communication apparatus. For this reason, in the all-optical communication system, the switchover being made for each path is applied. The fault avoidance being made for each path necessitates securing a node/link disjoint route, that allows the current route and the stand-by route not to pass through the identical communication apparatus/WDM transfer link in a transit point, between the path terminating point of a start-point apparatus and that of an end-point apparatus for a purpose of enhancing reliability. For this, the longer a route length of the path becomes, the more excessively the stand-by route has to be secured, which gives rise to the problem that the cost is raised.

In addition hereto, the related art causes a problem as well such as a low endurance against a multiple fault such that both of the current path and the stand-by path become faulty simultaneously.

As a method of solving this, there exists the technology of making a detour around a section, in which the path is divided into a plurality of sections and a fault recovery is performed for each section. The conventional example of such a technology of recovering a section fault is disclosed in Patent document 1 (JP-P2003-258851A). This optical communication system is configured of an add/drop node having a WDM transfer link with two routes, a junction node having a WDM transfer link with three routes or more, and a communication-net management apparatus. This optical communication system performs an operation in which the communication-net management apparatus sets/manages a current path and a plurality of stand-by paths that allow a detour to be made around one part of the current path, and one certain junction node existing in the route of the current path at the time that a fault has occurred, or the communication-net management apparatus retrieves a route for the stand-by path that allows a detour to be made around one part of the current path, and sets the stand-by path on this route, thereby allowing a fault to be avoided. Herein, the junction node employs an overhead of SONET/SDH or OTN OCh, thereby to detect a fault and to specify its position.

There is the problem that the technology disclosed in the conventional example cannot be applied for a detour being made around a section of the optical path including a plurality of the section detour routes (a plurality of the junction nodes) in the all-optical communication system.

The reason is that, when a fault has occurred in the optical path, an influence of the fault extends over all nodes existing in the route of the optical path because the optical signal of the optical path is not converted to an electrical signal in an intermediate node existing on the route. With both of the fault in the case that the optical signal has been lost due to an intersection of the fiber, and the fault in the case that deterioration in the optical signal has occurred, the fault of the optical path is detected in all intermediate nodes that are located in the downstream side of a faulty location. For this, plural junction nodes start a detour operation almost simultaneously, whereby it is impossible to avoid the fault only in an appropriate section.

SUMMARY OF THE INVENTION

Thereupon, the present invention has been accomplished in consideration of the above-mentioned problems, and an exemplary object thereof is to provide an optical communication system that enables a detour to be made only around the section including a faulty location at the time that a fault has occurred in the optical path having a plurality of the detour sections, and a method of monitoring a fault alarm.

The 1st invention for solving the above-mentioned problems is characterized in that an optical communication system comprising: a plurality of optical communication apparatuses each comprising an optical cross connector for switching a route of an optical path with an optical signal kept as it stands; a plurality of optical fiber WDM transfer links for making a connection between said optical communication apparatuses; and a control channel for making a connection between each of a plurality of said optical communication apparatuses and the other, wherein each of said plurality of said optical communication apparatuses comprises: a first monitor; a second monitor; an alarm comparator for comparing an alarm status of the optical path being preserved by said first monitor with an alarm status of the optical path being preserved by said second monitor; and a detour executor for determine whether or not a fault of the optical path exists according to a comparison result of the alarm statuses of the optical paths that said first monitor and said second monitor preserve, and making a section detour around one part of the optical path including a faulty location.

In the above-mentioned invention, the 2nd invention for solving the above-mentioned problems is characterized in that said first monitor monitors a signal alarm of the optical path on a data plane and said second monitor monitors a pseudo alarm on a control plane.

In the above-mentioned invention, the 3rd invention for solving the above-mentioned problems is characterized in that said optical communication apparatus comprises a pseudo alarm exchanger for transmitting a pseudo alarm mask signal to the optical communication apparatus in an upstream side of the path during execution of the section detour; and wherein a configuration is made so that the section detour is prevented from being executed in the upstream-side optical communication apparatus.

In the above-mentioned invention, the 4th invention for solving the above-mentioned problems is characterized in that said optical communication apparatus comprises a pseudo alarm exchanger for transmitting a pseudo alarm signal to the optical communication apparatus in an upstream side of the path at the time that the section detour has failed; and wherein a configuration is made so that the section detour is executed in the upstream-side optical communication apparatus.

The 5th invention for solving the above-mentioned problems is characterized in that an optical communication apparatus, comprising: an optical cross connector for switching a route of an optical path with an optical signal kept as it stands; a first monitor for branching one part of the optical signal in said optical cross connector and monitoring a status of the optical path; a second monitor for monitoring a pseudo alarm being exchanged on a control plane; an alarm comparator for comparing an alarm status being preserved by said first monitor with an alarm status being preserved by said second monitor; and a detour executor for making a detour based upon said alarm comparison result.

In the above-mentioned invention, the 6th invention for solving the above-mentioned problems is characterized in that said optical communication apparatus comprising a pseudo alarm exchanger for transmitting a pseudo alarm mask signal to the optical communication apparatus in an upstream side of the path during execution of the section detour.

In the above-mentioned invention, the 7th invention for solving the above-mentioned problems is characterized in that said optical communication apparatus comprising a pseudo alarm exchanger for transmitting a pseudo alarm signal to the optical communication apparatus in an upstream side of the path at the time that the section detour has failed.

The 8th invention for solving the above-mentioned problems is characterized in that a method of monitoring a fault alarm in an optical communication system comprising: a plurality of optical communication apparatuses each comprising an optical cross connector for switching of a route of an optical path with an optical signal kept as it stands; a plurality of optical fiber WDM transfer links for making a connection between said optical communication apparatuses; and a control channel for making a connection between each of a plurality of said optical communication apparatuses and the other, wherein a determination as to whether or not a fault exists is made by comparing an alarm status being preserved by the first monitor with an alarm status being preserved by the second monitor, each of which said optical communication apparatus comprises.

In the above-mentioned invention, the 9th invention for solving the above-mentioned problems is characterized in that said first monitor monitors a signal alarm of the optical path on a data plane and said second monitor monitors a pseudo alarm on a control plane.

The 10th invention for solving the above-mentioned problems is characterized in that a method of making a detour around a path section, being a faulty section, in an optical communication system comprising: a plurality of optical communication apparatuses each comprising an optical cross connector for switching of a route of an optical path with an optical signal kept as it stands; a plurality of optical fiber WDM transfer links for making a connection between said optical communication apparatuses; and a control channel for making a connection between each of a plurality of said optical communication apparatuses and the other, wherein, by comparing an alarm status being preserved by the first monitor with an alarm status being preserved by the second monitor, each of which said optical communication apparatus comprises, a determination as to whether or not a fault of the optical path exists is made, and a section detour is made around one part of the optical path including a faulty location.

In the above-mentioned invention, the 11th invention for solving the above-mentioned problems is characterized in that said first monitor monitors a signal alarm of the optical path on a data plane and said second monitor monitors a pseudo alarm on a control plane.

The present invention makes it possible to avoid a fault in an appropriate section including a faulty location without performing an erroneous operation in the other sections at the time that a fault has occurred in the optical path in which a plurality of detour sections, in the all-optical communication system.

Further, the present invention makes it possible to avoid a plurality of faulty positions and to make a detour around an appropriate section also in a case where the detour is impossible in a specific section due to occurrence of a plurality of faults, in the all-optical communication system.

The reason is that a first monitor monitors a main signal alarm, a second monitor a pseudo alarm on a control plane, and the detour is executed only at the time that both of the first and second monitors are in a status of having detected an alarm.

BRIEF DESCRIPTION OF THE DRAWINGS

This and other objects, features and advantages of the present invention will become more apparent upon a reading of the following detailed description and drawings, in which:

FIG. 8 is a table illustrating a change in the status of the alarm with the multi fault.

EXEMPLARY EMBODIMENTS

Next, the best mode for carrying out the invention will be explained in details by making a reference to the accompanied drawings.

Figure 1:
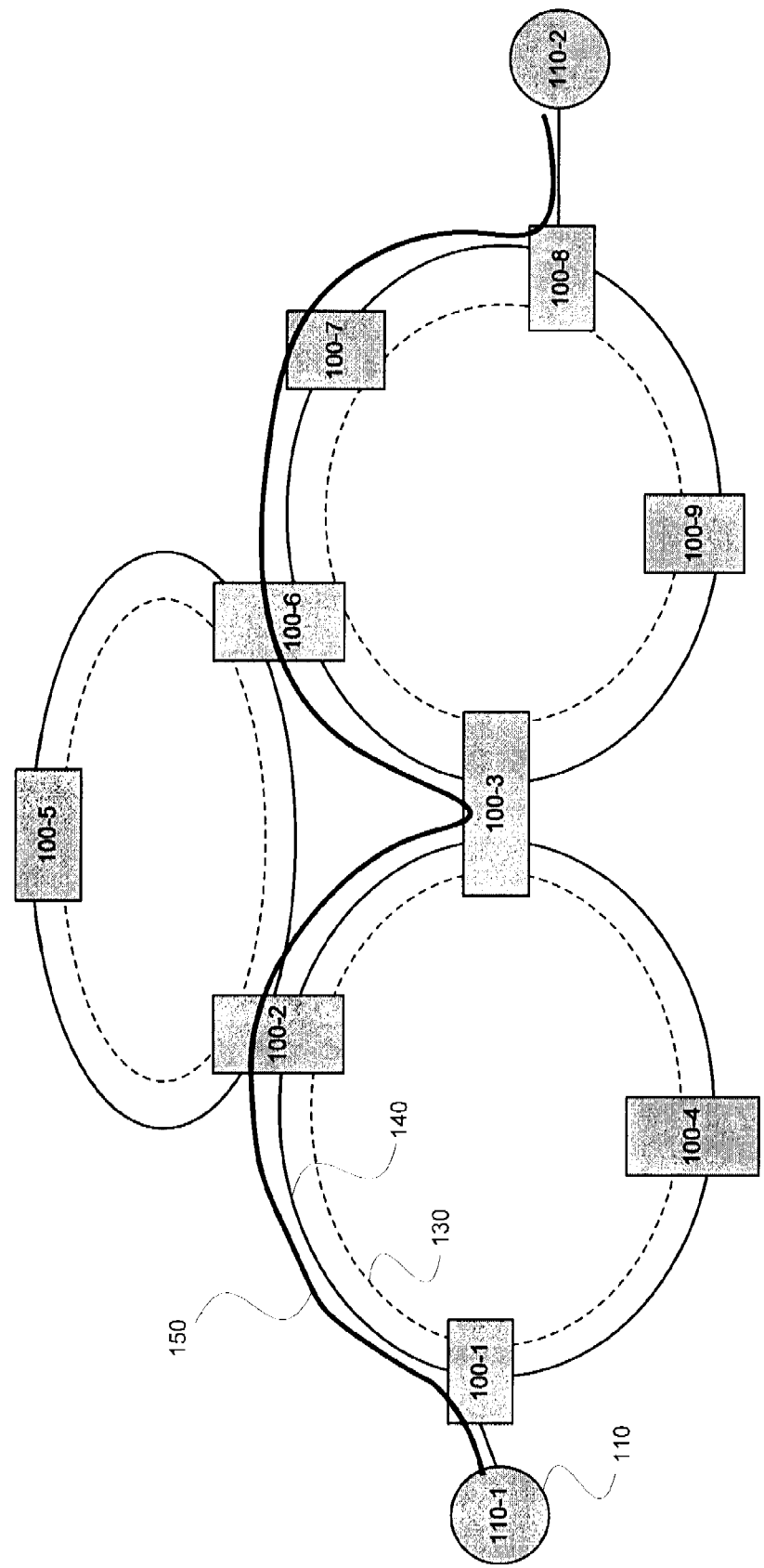
FIG. 1 is a network configuration view illustrating an example for carrying out a first invention.

In FIG. 1, an example of a network configuration in an all-optical communication system in an exemplary embodiment of the present invention is shown. The network is comprises of a plurality of optical communication apparatuses 100-1 to 100-9 for switching an optical signal and a plurality of client apparatuses 110-1 and 110-2 (only two client apparatuses are shown in the figure, and the other client apparatuses are not shown in the figure), and the neighboring optical communication apparatuses 100 are connected to each other by employing a control channel 130 and a WDM (Wavelength Division Multiplexing) transfer link 140 that is configured of wavelength-division-multiplexed optical fibers.

The optical communication apparatus 100 and the client apparatus 110 are connected via an optical fiber having a single wavelength. Herein, the control channel 130 indicates an OSC (Optical Supervisory Channel) that is wavelength-division-multiplexed to the WDM transfer link, or a dedicated line for control that is provided by a circuit other than the WDM transfer link. As an example of the client apparatus, there exists an IP/MPLS router, an Ethernet switch, or the like.

An optical path 150 is connected between the two client apparatuses 110 via one or a plurality of communication apparatuses 100, and there are the case of passing through the route between the client apparatuses with the optical signal kept as it stands, and the case of converting the optical signal from the client apparatus 110 to an electrical one in an input/output optical communication apparatus for the time being, and then converting it back in an optical one (hereinafter, referred to as an OEO process).

In the following explanation, a general term of the network plane constructed with the WDM in which a switchover of the optical signal is made with the optical path is a data plane, and a general term of the network plane constructed with the control channel in which control information for controlling the data plane is exchanged is a control plane. Herein, the control channel indicates one of an in-fiber control channel that is constructed within an optical fiber identical to the optical fiber through which the optical path passes, and an out-of-fiber control channel that is constructed by using an network other than the optical fiber.

Figure 2:
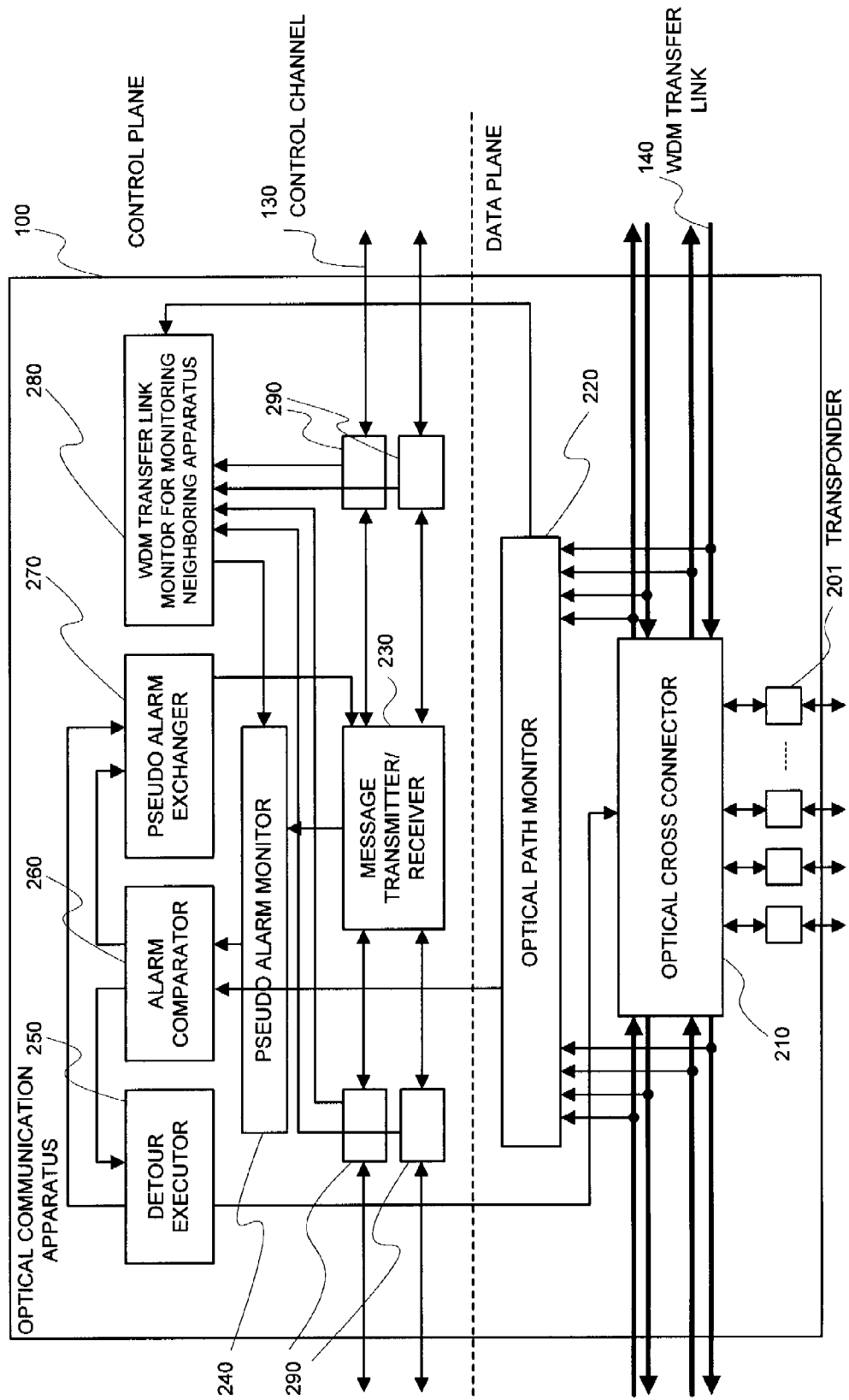
FIG. 2 is a block diagram illustrating a configuration of an optical communication apparatus, being a best mode for carrying out the first invention.

Next, a configuration of the optical communication apparatus will be explained by employing FIG. 2.

The optical communication apparatus 100 is comprised of a plurality of transponders 201 for performing the OEO process for the optical signal from the client apparatus, an optical cross connector 210 for performing a switchover of a route and a wavelength division multiplexing for the optical signal input from the transponder 201 and performing a wavelength separation, a switchover of a route, and a wavelength division multiplexing for a wavelength multiple signal input from the WDM transfer link 140, and thereafter, outputting them to the WDM transfer link 140, and an optical path monitor 220 (first monitor) for, in a downstream side and an upstream side of the optical cross connector 210, wavelength-separating one part of an optical power branched by employing an optical coupler etc., thereafter converting it to an electric signal, and monitoring whether or not a fault of each signal (a main signal alarm) exists.

In addition hereto, the optical communication apparatus 100, for a purpose of avoiding a section fault, includes a message transmitter/receiver 230 for transmitting/receiving a message via the control channel 130, a pseudo alarm monitor 240 for monitoring an alarm on the control plane, an alarm comparator 260 for comparing statuses of the main signal/pseudo alarm being preserved by the optical path monitor 220 with statuses of the main signal/pseudo alarm being preserved by the pseudo alarm monitor 240, a pseudo alarm mask unit 270 for, upon receipt of a result of an alarm comparison, transmitting/receiving a pseudo alarm signal and a pseudo alarm mask signal to/from the upstream side of the optical path; a detour executor 250 for executing a detour at the time of having determined that a switchover of the section of the optical path should be executed upon receipt of a result of the alarm comparison, a WDM transfer link monitor 280 for monitoring a fault of the WDM transfer link or the neighboring optical communication apparatus, and a control channel monitor 290 for monitoring a fault of each control channel.

Herein, the so-called pseudo alarm, which is information of a path fault that is intentionally caused to occur on the control plane, can be realized, for example, by employing a PathErr message or a Notify message of an RSVP (Resource reSerVation Protocol), being a signaling protocol in a GMPLS (Generalized Multi-Protocol Label Switching) control plane, or the like.

The pseudo alarm monitor 240 and the optical path monitor 220, each of which manages an identical optical path identifier enabling the optical path to be uniquely identified, and a status as to whether or not the alarm exists, can cause respective paths to correspond to each other by using the optical path identifier.

As a function of the WDM transfer link monitor 280, there exist the method of monitoring the OSC and the method of exchange wavelength map information. The WDM transfer link monitor 280 detects a fault of the WDM transfer link by utilizing the fact that the OSC as well together with the main signal becomes faulty at the time that the optical fiber has been disconnected because the OSC that is electrically terminated at each optical communication apparatus is multiplexed to the WDM transfer link. Further, with exchange of the wavelength map information, comparing transmission wavelength map information, which is transmitted from a neighboring node by using the OSC, with reception wavelength map information, which is detected by the optical path monitor 220 of its own optical communication apparatus, makes it possible to detect not only a blanket fault (fiber disconnection) of the WDM transfer link but also a fault of a single wavelength thereof.

In addition hereto, in these methods, not only a fault of the WDM transfer link but also a fault of the optical communication apparatus can be detected. In a case where the entirety of the WDM apparatus has been downed due to an interruption of a power source, detecting a fault of the OSC enables a fault of the optical communication apparatus to be detected, and in a case where the entirety or one part of optical cross connector has becomes faulty, the optical communication apparatus sends information of an input wavelength from the WDM transfer link and an input wavelength from the transponder 201 as transmission wavelength map information to a neighboring optical communication apparatus, thereby enabling the neighboring optical communication apparatus to detect a specific fault of the optical cross connector 210 by comparing the transmission wavelength map information with the reception wavelength map information.

Next, an operation of the entirety of this exemplary embodiment will be explained in details by making a reference to flowcharts of FIG. 3, FIG. 4 and FIG. 5.

Figure 3:
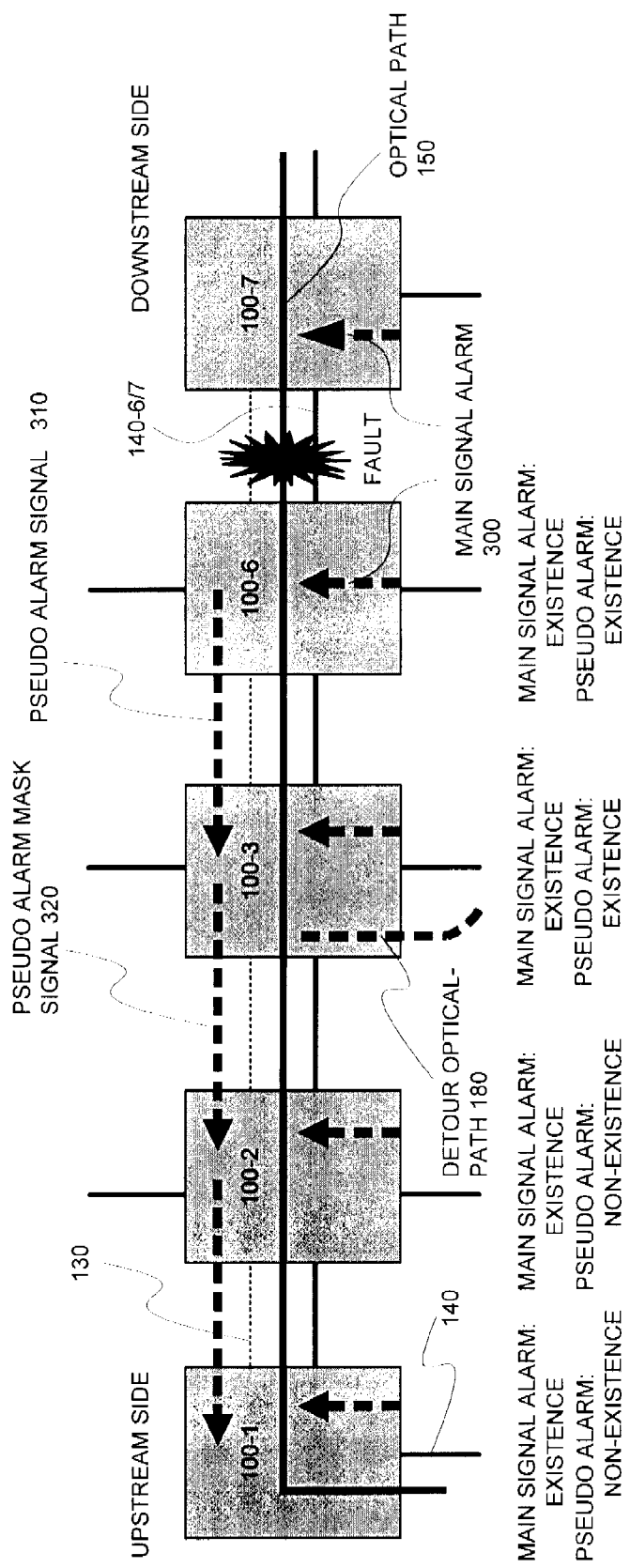
FIG. 3 is a view illustrating flows of a main signal alarm and a pseudo alarm of the first invention.

In FIG. 3, the optical communication apparatus through which the optical path 150, being a current path, passes is shown. In this configuration, the case that the WDM transfer link between the optical communication apparatus 100-6 and the optical communication apparatus 100-7 have become faulty will be explained. When the WDN transfer link 140-6/7 becomes faulty, a fault of the WDM transfer link is detected in the WDM transfer link monitor 280 of the optical communication apparatus 100-6 and the optical communication apparatus 100-7, and simultaneously wherewith, a fault of the optical path is detected in the optical path monitors 220 of all of the optical communication nodes (100-1, 100-2, 100-3, 100-6, 100-7, and 100-8) through which the current path passes.

Hereinafter, operations of the optical communication apparatus having detected a fault of the WDM transfer link, and the node in the upstream side thereof will be shown. Herein, it is assumed that directions of the terminating points of the optical path are an upstream side/a downstream side, respectively, and the direction in which the optical communication apparatus having an authorized power of making a detour around the optical path for a faulty position exists is called an upstream side. Further, the optical communication apparatus 100-7, which is a node in the downstream side of the optical path, detects a fault of the WDM transfer link; however, no mention about it is made in details in this specification of this claimed invention.

Figure 4:
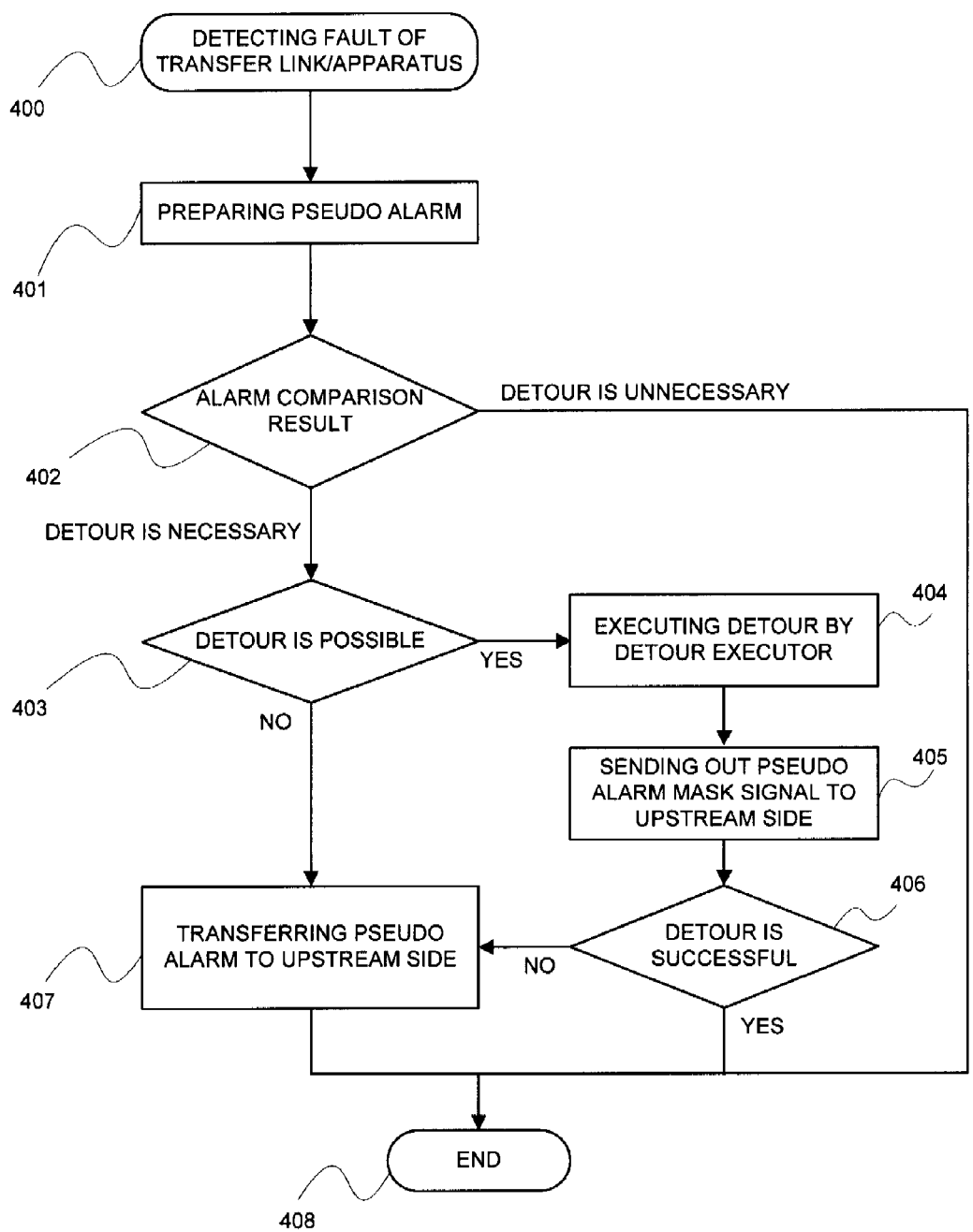
FIG. 4 is a flowchart illustrating an operation of the optical communication apparatus at an end of the location in which a fault has been detected.
Figure 5:
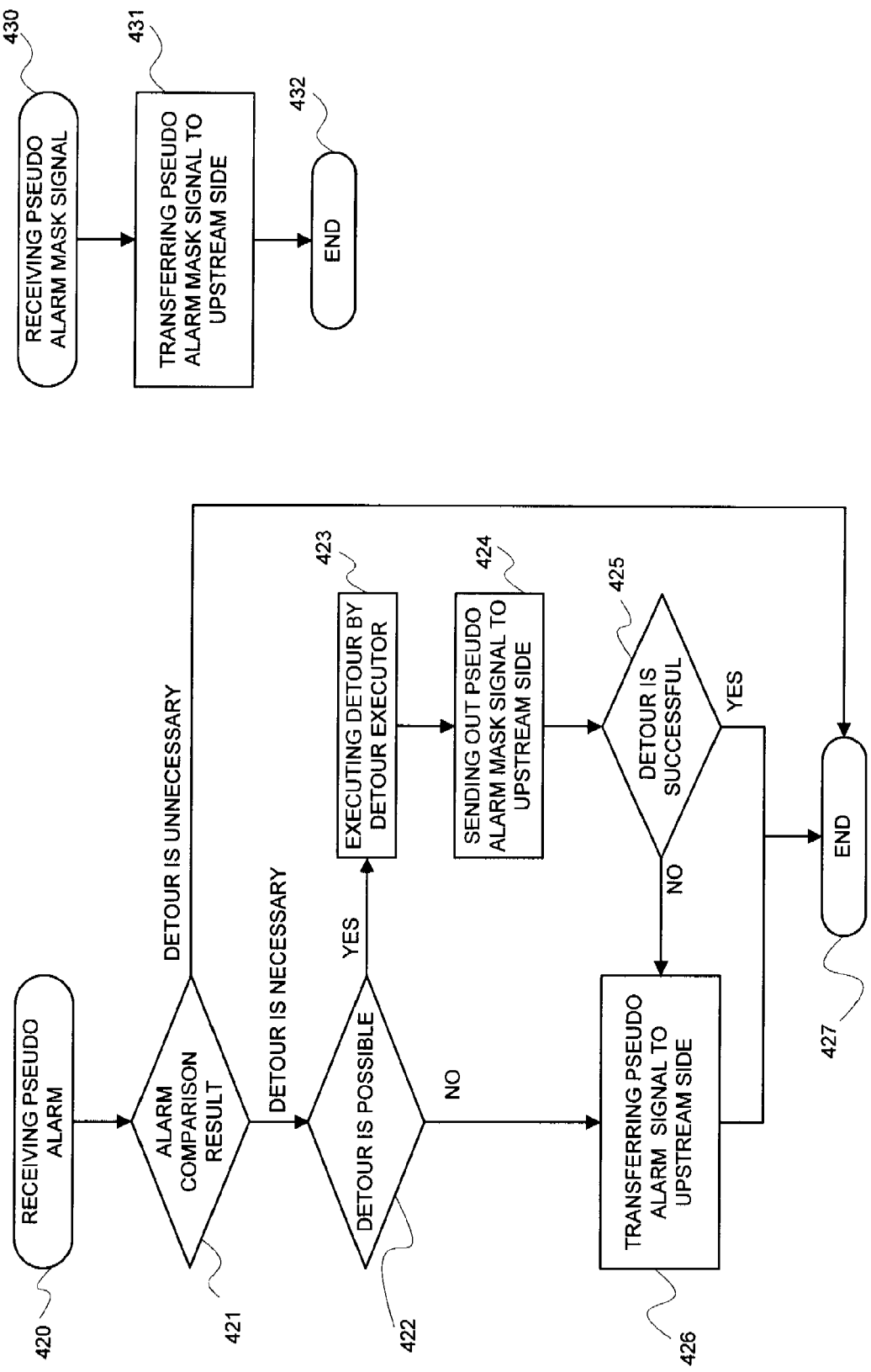
FIG. 5 is a flowchart illustrating an operation of the optical communication apparatus that is located in a upstream of the optical communication apparatus at an end of the location in which a fault has been detected.

An operation of the optical communication apparatus 100-6 having detected a fault of the WDM transfer link, being a node in the upstream side of the optical path, is shown in FIG. 4.

The WDM transfer link monitor 280 of the optical communication apparatus 100-6 having detected a fault of the WDM transfer link (Step: 400) prepares a pseudo alarm, and notifies it to the pseudo alarm monitor 240 (Step: 401). The alarm comparator 260 compares statuses of the main signal/pseudo alarm of the pseudo alarm monitor 240 with statuses of the main signal/pseudo alarm of the optical path monitor 220, and determines statuses of the main signal/pseudo alarm of the optical path identifier having identical statuses of the main signal/pseudo alarm based upon a table of FIG. 6 (Step: 402). When "the detour is unnecessary", the operation is finished, and when "the detour is necessary", after the detour executor 250 determines whether the detour is possible, it executes the detour if possible (Steps: 403 and 404). During execution of the detour, the pseudo alarm exchanger 270 transmits a pseudo alarm mask signal to the upstream-side optical communication apparatus, and waits until an execution result of the detour is known (Step: 405). In Step: 406, the operation is finished if the detour result is successful, and the pseudo alarm exchanger 270 transmits a pseudo alarm to the upstream-side optical communication apparatus (Steps; 406 and 407) and the operation is finished when the detour result indicates that execution is unsuccessful and when the detour is impossible in the Step: 403. Additionally, a determination as to whether the detour result is successful/unsuccessful is made in the optical path monitor 220, based upon whether the main signal alarm of the optical path caused to make a detour has been lifted up.

An operation of the upstream-side optical communication apparatus having received the pseudo alarm signal or the pseudo alarm mask signal will be explained by employing FIG. 5.

Figure 6:
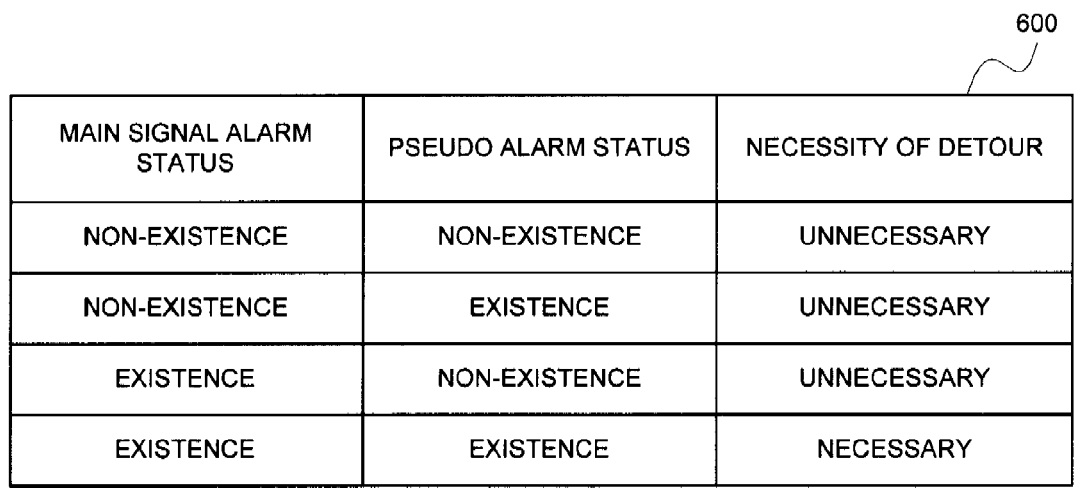
FIG. 6 is a table illustrating a necessity of a detour due to statuses of an optical path alarm and a pseudo alarm.

In the optical communication apparatus that has received the pseudo alarm signal and has changed the status of the pseudo alarm monitor to a status of the alarm being "existent" (Step: 420), the alarm comparator 260 compares statuses of the main signal/pseudo alarm of the pseudo alarm monitor 240 with statuses of the main signal/pseudo alarm of the optical path monitor 220, and determines statuses of the main signal/pseudo alarm of the optical path identifier having identical statuses of the main signal/pseudo alarm based upon a table of FIG. 6 (Step: 421). When "the detour is unnecessary", the operation is finished, and when "the detour is necessary", after the detour executor 250 determines whether the detour is possible, it executes the detour if possible (Steps: 422 and 423). During execution of the detour, the pseudo alarm exchanger 270 transmits a pseudo alarm mask signal to the upstream-side optical communication apparatus, and waits until an execution result of the detour is known (Step: 424). The operation is finished if a result of the detour is successful in Step: 425, and the pseudo alarm exchanger 270 transmits a pseudo alarm signal to the upstream-side optical communication apparatus (Step: 426) and the operation is finished when the detour result indicates that execution of the detour is unsuccessful and when the detour is impossible in the Step: 422. Additionally, a determination as to whether the detour is unsuccessful/unsuccessful is made in the optical path monitor 220 based upon whether the main signal alarm of the optical path caused to make a detour has been lifted up.

Next, an operation of the case of having received the pseudo alarm mask signal will be explained.

The pseudo alarm exchanger 270 having received the pseudo alarm mask signal (Step: 430) changes the pseudo alarm status of the corresponding optical path, which the pseudo alarm monitor monitors, to a status of being "nonexistent", and transfers the pseudo alarm mask signal to the upstream-side optical communication apparatus (Step: 431), and the operation is finished.

With such an operation, in a case where a fault has occurred in the WDM transfer link of the optical communication apparatuses 100-6 and 100-7, a main signal alarm 300 is detected in all of the optical communication apparatuses through which the optical path 150 passes, a pseudo alarm signal 310 is exchanged between the optical communication apparatuses 100-6 and 100-3, a pseudo alarm mask signal 320 is transferred from the optical communication apparatus 100-3 to the optical communication apparatus 100-2 and to the optical communication apparatus 100-1, and resultantly, statuses of the main signal alarm and the pseudo alarm signal becomes the statuses shown in FIG. 3.

Next, a procedure of how the optical communication apparatus having received the pseudo alarm signal determines that the detour is possible will be explained.

An identifier of the faulty WDM transfer link is included in the pseudo alarm. The detour executor of each optical communication apparatus knows detour route information pre-set by an administrator, or detour route information computed with a path design tool etc. Or, it is also possible for the optical communication apparatus to autonomously compute the detour route based upon information of the apparatus at termination points of the fault avoidance route pre-set by an administrator. The detour executor 250 investigates whether a fault is avoidable based upon detour route information obtained in these methods. An example of FIG. 3, with the optical communication apparatus 100-6, the detour route (100-6, 100-5, 100-2, 100-3, 100-9, and 100-8) exists; however the detour executor 250 of the optical communication apparatus 100-6 determines that the detour is impossible because this route includes the existing route of the optical path and a loop occurs in the optical path, and the pseudo alarm signal is transmitted to the optical communication apparatus 100-3.

With the operation mentioned above based, in a case where a fault has occurred in the WDM transfer link of the optical communication apparatuses 100-6 and 100-7, a detour optical-path 160 having a route of the optical communication apparatuses 100-3, 100-9, and 100-8 is established as a result of the detour, thereby enabling the WDM transfer link fault to be avoided.

Figure 7:
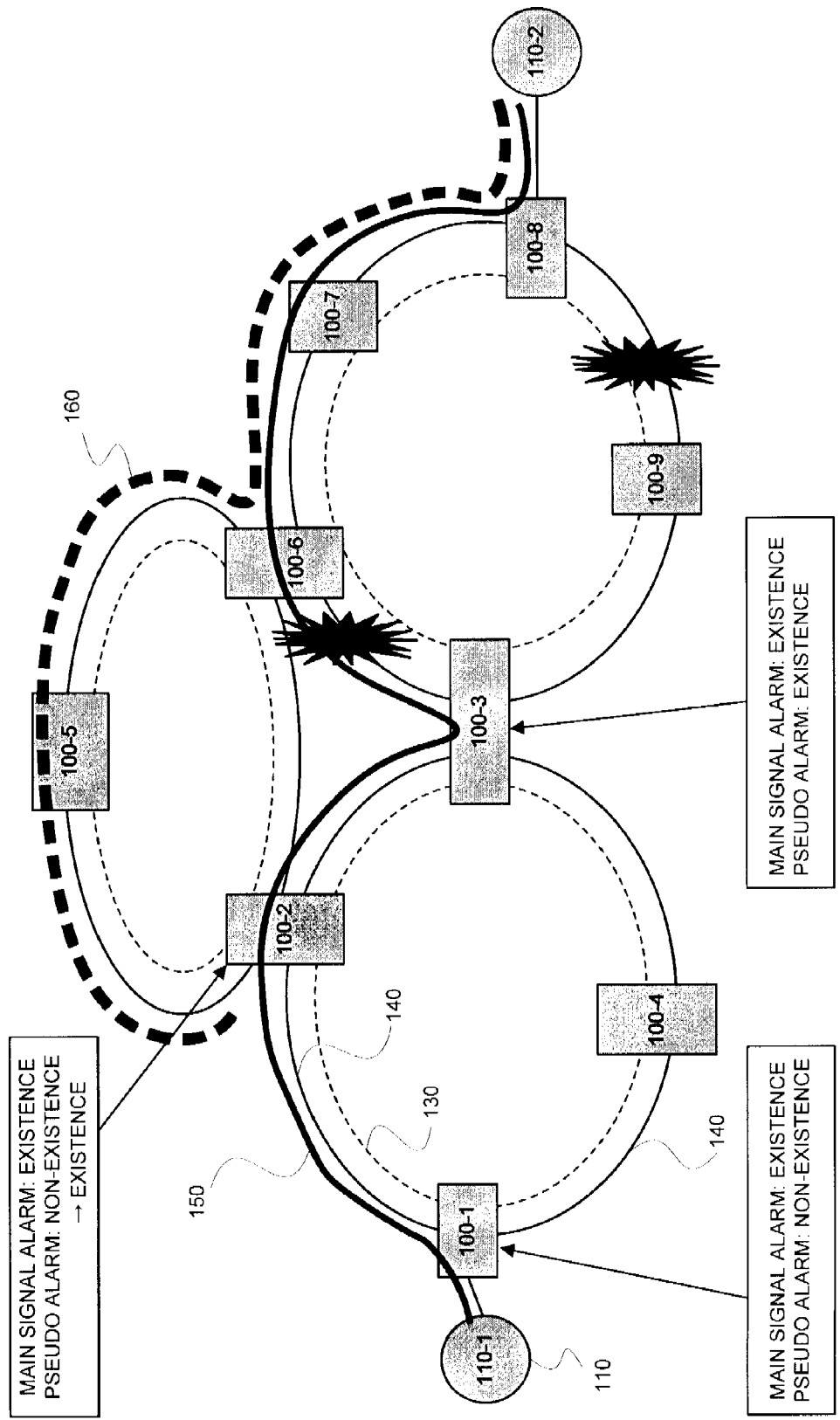
FIG. 7 is a network configuration view for explaining a detour procedure of a multi fault.

Next, a multiple fault will be explained by employing FIG. 7.

When the optical communication apparatus 100-3 detects the WDM transfer link fault, the detour executor 250 executes the section detour, and simultaneously therewith, the alarm exchanger 270 sends out a pseudo alarm mask signal to the upstream-side optical communication apparatus 100-2 (Step: 405), according to a flowchart described in FIG. 4. The detour by the optical communication apparatus 100-3 has failed because establishment of the detour optical-path has failed due to an occurrence of another fault in the optical communication apparatus 100-9, and the detour executor 250 of the optical communication apparatus 100-3 is notified of a failure of the detour.

Upon receipt of a notification of the failure, the pseudo alarm exchanger 270 of the optical communication apparatus 100-3 sends out a pseudo alarm signal to the upstream-side optical communication apparatus 100-2 (Steps: 406 and 407). In the optical communication apparatus 100-2 having received the pseudo alarm signal, the status of the alarm of is changed as described in a table 610 and table 620 of FIG. 8, a detour process is started according to the flowchart described in FIG. 5, the detour optical-path 160 having a route of the optical communication apparatuses 100-2, 100-5, 100-6, 100-7, and 100-8 is established as a result of the detour, thereby enabling the multiple fault to be avoided.

In this exemplary embodiment, comparing the status of the main signal alarm on the data plane with that of the pseudo alarm on the control plane makes it possible to make a section detour in the all-optical network without performing an erroneous operation in the other sections by using a route, which allows a detour to be made only around the faulty section in which a fault has occurred, also in a case where a plurality of section detour routes exist halfway the current path route.

In addition hereto, in this exemplary embodiment, transferring the pseudo alarm signal to the upstream side at the moment that the detour has failed makes it possible to make a detour around an appropriate section by avoiding a plurality of faulty positions also in a case where a plurality of faults have occurred.

The present invention is applicable to an application such as a fault avoidance control program for making a detour only around a faulty section, in the all-optical communication system for making a switchover of a route without converting the optical signal to an electrical signal in an intermediate apparatus, that is, with the optical signal kept as it stands. Further, the present invention is applicable to an application such as a function of specifying a faulty position in the all-optical communication system.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

What is claimed is:

1. An optical communication system comprising:
a plurality of optical communication apparatuses each comprising an optical cross connector for switching a route of an optical path with an optical signal kept as it stands;
a plurality of optical fiber WDM transfer links for making a connection between said optical communication apparatuses; and
a control channel for making a connection between each of a plurality of said optical communication apparatuses and the other, wherein each of said plurality of said optical communication apparatuses comprises:
a first monitor;
a second monitor;
an alarm comparator for comparing an alarm status of the optical path being preserved by said first monitor with an alarm status of the optical path being preserved by said second monitor; and
a detour executor for determine whether or not a fault of the optical path exists according to a comparison result of the alarm statuses of the optical paths that said first monitor and said second monitor preserve, and making a section detour around one part of the optical path including a faulty location.

2. The optical communication system according to claim 1, wherein:
said first monitor monitors a signal alarm of the optical path on a data plane; and
said second monitor monitors a pseudo alarm on a control plane.

3. The optical communication system according to claim 1:
wherein said optical communication apparatus comprises a pseudo alarm exchanger for transmitting a pseudo alarm mask signal to the optical communication apparatus in an upstream side of the path during execution of the section detour; and
wherein a configuration is made so that the section detour is prevented from being executed in the upstream-side optical communication apparatus.

4. The optical communication system according to claim 1:
wherein said optical communication apparatus comprises a pseudo alarm exchanger for transmitting a pseudo alarm signal to the optical communication apparatus in an upstream side of the path at the time that the section detour has failed; and
wherein a configuration is made so that the section detour is executed in the upstream-side optical communication apparatus.

5. An optical communication apparatus, comprising:
an optical cross connector for switching a route of an optical path with an optical signal kept as it stands;
a first monitor for branching one part of the optical signal in said optical cross connector and monitoring a status of the optical path;
a second monitor for monitoring a pseudo alarm being exchanged on a control plane;
an alarm comparator for comparing an alarm status being preserved by said first monitor with an alarm status being preserved by said second monitor; and
a detour executor for making a detour based upon said alarm comparison result.

6. The optical communication apparatus according to claim 5, said optical communication apparatus comprising a pseudo alarm exchanger for transmitting a pseudo alarm mask signal to the optical communication apparatus in an upstream side of the path during execution of the section detour.

7. The optical communication apparatus according to claim 5, said optical communication apparatus comprising a pseudo alarm exchanger for transmitting a pseudo alarm signal to the optical communication apparatus in an upstream side of the path at the time that the section detour has failed.

8. A method of monitoring a fault alarm in an optical communication system comprising: a plurality of optical communication apparatuses each comprising an optical cross connector for switching of a route of an optical path with an optical signal kept as it stands; a plurality of optical fiber WDM transfer links for making a connection between said optical communication apparatuses; and a control channel for making a connection between each of a plurality of said optical communication apparatuses and the other, said method comprising:
  determining whether or not a fault of an optical path exists by comparing an alarm status being preserved by the first monitor with an alarm status being preserved by the second monitor, each of which said optical communication apparatus comprises, and making a section detour around one part of the optical path including a faulty location;
  transmitting a pseudo alarm mask signal to the optical communication apparatus in an upstream side of the path during execution of said section detour, and preventing the section detour from being executed in said optical communication apparatus in the upstream side of the path; and
  transmitting a pseudo alarm signal to said optical communication apparatus in the upstream side of the path at the time said section detour has failed, and executing the section detour in said optical communication apparatus in the upstream side of the path.

9. The method of monitoring a fault alarm according to claim 8, wherein:
  said first monitor monitors a signal alarm of the optical path on a data plane; and
  said second monitor monitors a pseudo alarm on a control plane.

10. A method of making a detour around a path section, being a faulty section, in an optical communication system comprising: a plurality of optical communication apparatuses each comprising an optical cross connector for switching of a route of an optical path with an optical signal kept as it stands; a plurality of optical fiber WDM transfer links for making a connection between said optical communication apparatuses; and a control channel for making a connection between each of a plurality of said optical communication apparatuses and the other, wherein, by comparing an alarm status being preserved by the first monitor with an alarm status being preserved by the second monitor, each of which said optical communication apparatus comprises, a determination as to whether or not a fault of the optical path exists is made, and a section detour is made around one part of the optical path including a faulty location.

11. The method of making a detour around a path section according to claim 10, wherein:
  said first monitor monitors a signal alarm of the optical path on a data plane; and
  said second monitor monitors a pseudo alarm on a control plane.

\* \* \* \* \*